United States Patent Office 3,325,364  
Patented June 13, 1967

3,325,364  
PROCESS FOR STABILIZING ENZYME COMPOSITIONS  
A. Jay Merritt, New Rochelle, and Morris A. Kesselman, Yonkers, N.Y., assignors to U.S. Vitamin & Pharmaceutical Corporation, a corporation of Delaware  
No Drawing. Filed Apr. 18, 1966, Ser. No. 543,029  
9 Claims. (Cl. 167—73)

This application is a continuation-in-part of our application Ser. 278,979, filed May 8, 1963, now abandoned.

This invention relates to a process for preparing stabilized aqueous solutions containing a proteolytic enzyme, and more particularly to such solutions containing a vasoconstrictor amine. It further relates to therapeutically effective, stabilized aqueous solutions containing proteolytic enzymes and a vasoconstrictor amine.

Simple, aqueous solutions of proteolytic enzymes are extremely unstable, the enzyme suffering appreciable destruction, as evidenced by loss in activity, within a few hours after the solution has been prepared. Furthermore, when such aqueous solutions of proteolytic enzymes contain vasoconstrictor amines, additional deleterious effects on the enzymes become apparent.

It is known that by adding a protein or a partially hydrolyzed protein, such as gelatin or partially hydrolyzed gelatin respectively, to aqueous solutions of proteolytic enzymes, it is possible to effect some stabilization of the enzymic activity; however, at best the enzymes in such stabilized solutions retain their activities for periods of only about five days, and it is consequently necessary to prepare fresh solutions about every five days and to discard the unused older solutions. This obviously limits the commercial value of such preparations.

Witty and Clark (U.S. Patent No. 2,887,435) have been able to prepare aqueous solutions of limited stability containing trypsin and a vasoconstrictor amine by adding gelatin to such solutions. The resulting solutions are stable at room temperature for a period of from about 5 to 8 days and thus obviously possess a shelf life of very short duration.

Also, numerous workers have reported stabilization of trypsin in aqueous solutions by the addition thereto of calcium ions. For example, Nord et al., Arch. Biochem. Biophys. 33, 320 (1951); 65, 120 (1956), have reported that calcium ions stabilize trypsin against auto-digestion and that trypsin in aqueous solutions containing 0.1 M calcium acetate retains 65% of its activity after storage for 20 hours at 30° C., whereas in the absence of calcium ions only 16% of the activity is retained under the same conditions. Other workers, Gorini, Biochem. et Biophys. Acta, 7, 318 (1951); Green, J. Am. Chem. Soc., 74, 2122 (1952) and Crewther, Australian J. Biol. Science, 6, 597 (1953), have shown similar stabilization effects by calcium ions, but only for periods of less than 24 hours. Thus, substantial losses in trypsin activity still occurred although these losses were less than those occurring in the absence of calcium ions.

The last three workers have further shown that other metallic ions such as, for example, cadmium, cobalt, chromium, aluminum, magnesium and manganese stabilize trypsin in somewhat the same manner as calcium ions.

A somewhat greater degree of stabilization of trypsin by calcium ions has been reported by Bush, J. Am. Pharm. Assoc., 51, 697 (1962), but this stabilization was effected in a polyethylene ointment base and not in aqueous solutions. The use of a combination of a calcium salt and an amino acid to stabilize trypsin has been reported in British Patent No. 900,115 and the corresponding U.S. Patent No. 3,050,445. However, all of the aqueous solutions disclosed in this patent also contain 30% of polyethylene glycol.

Furthermore, we have found that in the absence of polyethylene glycol the protection against loss of activity of the trypsin cannot be maintained whether or not a vasoconstrictor amine such as phenylephrine is added to the solution. Besides, preparations containing polyethylene glycol are unsuitable for application to the nasal mucosa because of a tendency to irritate the mucosa and are thus unsuitable for the purposes for which such solutions may be used.

It is, accordingly, an object of this invention to provide substantially stabilized aqueous solutions of proteolytic enzymes, and preferably also containing a vasoconstrictor amine; which solutions will be stabilized for a period of about one year. It is another object to provide a process for the preparation of such aqueous solutions.

We have made the surprising discovery that this extended period of stabilization can be achieved by introducing into the solution a source of a divalent metal ion such as calcium, manganese or cadmium and a proteinaceous material, such as an edible protein or a partially hydrolyzed protein.

The proteolytic enzymes which can be protected in aqueous solutions by the combination of the divalent metal ion and a protein or partially hydrolyzed protein include the proteases such as, for example, trypsin, chymotrypsin, enterokinase, papain, pepsin and bromelin.

The water-soluble, pharmaceutically acceptable salts of calcium, cadmium or manganese are suitable additives for stabilizing the enzyme solutions. Among the suitable salts finding use in the stabilized solutions of this invention are calcium acetate, calcium citrate, calcium chloride, calcium gluconate, calcium lactate, calcium levulinate, calcium malate, calcium maleate, calcium succinate, calcium glycerophosphate, cadmium chloride, cadmium acetate, cadmium sulfate, manganese acetate, manganese chloride, manganese citrate and manganese sulfate.

For purposes of this invention the edible protein or partially hydrolyzed protein may be selected from such materials as gelatin, casein, or collagen, or partially hydrolyzed gelatin, partially hydrolyzed casein, or partially hydrolyzed collagen. The partially hydrolyzed material may be obtained by means of acid or enzymatic hydrolysis. For example, a partially hydrolyzed gelatin suitable for the purposes of this invention may be obtained by autoclaving a 10% aqueous solution of U.S.P. gelatin to which some sulfuric acid has been added.

The vasoconstrictor amines used in the stabilized compositions are the commonly used vasoconstrictor amines, preferably in the form of their water-soluble inorganic salts, such as the hydrochloride. Among the vasoconstrictor amines suitable for incorporation in the stable compositions are phenylephrine, ephedrine, tuamine, and phenylisopropanolamine.

In carrying out the present invention we prefer to use a substantially pure proteolytic enzyme such as, for example, crystalline trypsin or chymotrypsin. The concentration of the trypsin in the aqueous solution is not particularly critical, but for most purposes within the scope of the present invention it will fall within the range of from about 0.2 to 5 mg. of the enzyme per cc.

The stable compositions of the invention are prepared to contain from about 20 to 300 mg. of the edible protein or partially hydrolyzed protein, such as, for example, partially hydrolyzed gelatin, per mg. of the proteolytic enzyme. Preferably, about 125 mg. of the edible protein or partially hydrolyzed protein per mg. of proteolytic enzyme is employed.

The stable solutions are prepared to be from about 0.002 molar to 0.2 molar with respect to the metallic ion; that is, the calcium, cadmium, or manganese ion. In practicing the invention we prefer to use a narrower range of from about 0.01 to 0.1 molar, preferably a solution which is about 0.0125 molar, with respect to the metallic ion.

The vasoconstrictor amine is present in the solution in an amount from about 0.5 to 12.5 mg. per cc., preferably about 2.5 mg. per cc., in the form of its soluble hydrochloride salt.

The stable solutions of this invention are acidic in nature, a pH in the range of between about 5 to 7 being preferred. At this pH range the solution exhibits its greatest stability, and the vasoconstrictor amine remains in solution.

The stable solutions of our invention may also contain a preservative, such as chlorobutanol, benzalkonium chloride, methyl paraben, or propyl paraben, to prevent microbial contamination. In addition, sweetening and flavoring agents, such as saccharin and lemon extract may also be included.

In practicing the process of this invention, the edible protein or partially hydrolyzed protein and a suitable calcium, cadmium or manganese salt are dissolved in water. The vasoconstrictor amine may also be added at this point. The pH of the solution is adjusted to about 7.0 by the addition of an alkali such as sodium or potassium hydroxide, and the proteolytic enzyme added and dissolved therein. If necessary the pH is adjusted to between about 5 to 7 by the addition of a pharmaceutically acceptable mineral acid, preferably hydrochloric acid. The solution is then brought to volume by addition of water. Preferably, we prepare an aqueous solution of the protein or partially hydrolyzed protein in the desired concentration and use this solution instead of water to dissolve the constituents. Where desired, preservatives, sweeteners and flavoring agents may be added either before or after the addition of the proteolytic enzyme. At times, the solution after preparation develops a slight cloudiness. This can be effectively removed by allowing the freshly prepared solution to stand overnight and then filtering.

The stable solutions of the present invention possess mucolytic properties which make them particularly useful in the treatment of nasal congestion in such conditions as sinusitus, asthma, and upper respiratory infections.

The invention will appear more fully from the examples which follow, which are set forth by way of illustration only; and it is to be understood that it is here intended to cover all changes and modifications of the examples herein which do not constitute departures from the spirit and scope of the invention.

*Example I*

A 5% solution of partially hydrolyzed gelatin was prepared by dissolving 20 g. of partially hydrolyzed gelatin in sufficient water to make the final volume 400 cc. To 350 cc. of this solution were added 1.0 g. of phenylephrine hydrochloride and 1.2 g. of chlorobutanol. In the resulting solution were dissolved 0.88 g. calcium acetate U.S.P. and 20% NaOH was added to bring the pH to about 7.0. Trypsin (0.16 g.) was added and the solution stirred until solution occurred. The pH of the solution was about 6.9. The solution was brought to a volume of 400 cc. by the addition of the partially hydrolyzed gelatin solution and was allowed to stand overnight at room temperature. A small amount of cloudiness formed and was removed by filtration. The final solution had the following composition:

Trypsin (0.4 mg.)/cc. _____units__ 1000
Calcium acetate _____M__ 0.0125
Partially hydrolyzed gelatin _____percent__ 5
Phenylephrine hydrochloride _____mg./cc__ 2.5
Chlorobutanol _____mg./cc__ 3

By following the procedure outlined in Example I, the stable solutions of proteolytic or mucolytic enzymes having the following compositions were prepared.

*Example II*

Trypsin (0.4 mg.)/cc. _____units__ 1000
Calcium levulinate _____M__ 0.0125
Chlorobutanol _____mg./cc__ 4
Gelatin _____percent__ 5
Phenylephrine hydrochloride _____mg./cc__ 2.5
pH _____ 6.75

*Example III*

Trypsin (0.4 mg.)/cc. _____units__ 1000
Calcium succinate _____M__ 0.0125
Chlorobutanol _____mg./cc__ 4
Casein _____percent__ 5
Ephedrine hydrochloride _____mg./cc__ 2.0
pH _____ 6.8

*Example IV*

Trypsin (0.5 mg.)/cc. _____units__ 1250
Cadmium sulfate _____M__ 0.0100
Chlorobutanol _____mg./cc__ 3
Partially hydrolyzed gelatin _____percent__ 5
Phenylephrine hydrochloride _____mg./cc__ 2.0
pH _____ 7.0

*Example V*

Chymotrypsin _____mg./cc__ 0.5
Calcium acetate _____M__ 0.0125
Partially hydrolyzed gelatin _____percent__ 5
Ephedrine hydrochloride _____mg./cc__ 2.0
Chlorobutanol _____mg./cc__ 4
pH _____ 6.5

*Example VI*

Chymotrypsin _____mg./cc__ 0.4
Manganese chloride _____M__ 0.0125
Partially hydrolyzed casein _____percent__ 5
Tuamin hydrochloride _____mg./cc__ 2.5
Chlorobutanol _____mg./cc__ 4
pH _____ 6.9

*Example VII*

Papain _____mg./cc__ 0.5
Calcium lactate _____M__ 0.0125
Partially hydrolyzed gelatin _____percent__ 5
Ephedrine hydrochloride _____mg./cc__ 2.0
Chlorobutanol _____mg./cc__ 4
pH _____ 7.0

*Example VIII*

Papain _____mg./cc__ 0.5
Cadmium chloride _____M__ 0.0200
Collagen _____percent__ 5
Phenylisopropanolamine hydrochloride
                                        mg./cc__ 3.0
Chlorobutanol _____mg./cc__ 3
pH _____ 6.6

*Example IX*

Trypsin _____mg./cc__ 1
Calcium acetate _____M__ 0.0200
Partially hydrolyzed gelatin _____percent__ 6
Phenylephrine hydrochloride _____mg./cc__ 3.0
Chlorobutanol _____mg./cc__ 4
pH _____ 6.7

*Example X*

Trypsin _____units/cc__ 1000
Calcium acetate _____M__ 0.0125
Partially hydrolyzed gelatin _____percent__ 5
Phenylephrine hydrochloride _____mg./cc__ 2.5
Chlorobutanol _____mg./cc__ 3
pH _____ 6.8

Example XI

| | | |
|---|---|---|
| Trypsin | mg./cc. | 2 |
| Calcium acetate | M. | 0.0625 |
| Gelatin | percent | 25 |
| Phenylephrine | mg./cc. | 12.5 |
| Chlorobutanol | mg./cc. | 3 |
| pH | | 6.8 |

In similar manner other solutions comprising varying combinations of a proteolytic enzyme, a water-soluble, pharmaceutically acceptable salt of calcium, cadmium or manganese, a protein or partially hydrolyzed protein, and a vasoconstrictor amine may be prepared. Such solutions are suitable for use in aerosol sprays and media for topical and parenteral application.

Table I sets forth the variations in the extent of stabilization of trypsin achieved with different additives and combinations thereof. The activity of the trypsin reported in this table and in the examples was determined according to the method described in the National Formulary XI, page 385.

There was no change in the phenylephrine content of the combination after standing for one year at room temperature.

Approximately the same extent of stabilization was obtained when a pharmaceutically acceptable salt of cadmium or manganese was used in place of the calcium salt.

cally acceptable salts is added to the solution at the first step.

4. A process according to the process claimed in claim 3 wherein the vasoconstrictor amine is phenylephrine hydrochloride.

5. A process according to the process of claim 4 wherein the aqueous solution of the proteinaceous substance is an aqueous solution of partially hydrolyzed gelatin in a concentration of about 5%.

6. A process according to the process claimed in claim 5 wherein the calcium salt is calcium acetate and is added in an amount so that its final concentration will be about 0.0125 M, the phenylephrine hydrochloride is added in an amount so that its final concentration will be 2.5 mg. per cc., the trypsin is added in an amount so that its final concentration will be about 1000 units per cc., and a preservative against microbial deterioration is added before the first adjustment of the pH.

7. A substantially stable aqueous solution of a proteolytic enzyme comprising the proteolytic enzyme selected from the group consisting of trypsin, chymotrypsin, papain, enterokinase, pepsin and bromelin, a proteinaceous material selected from the group consisting of gelatin, casein, collagen, partially hydrolyzed gelatin, partially hydrolyzed casein, and partially hydrolyzed collagen, and a water-soluble, pharmaceutically acceptable salt of a metal selected from the group consisting of calcium, cadmium,

TABLE I

[Effect of additives on the stability of trypsin in aqueous solutions (each solution also contained 2.5 mg. of phenylephrine hydrochloride per cc.), trypsin potency (units/cc.)]

| Additives | Theory | Initial | 1 mo. at 37° C. | Percent Retention | 2 mos. at 37° C. | Percent Retention | 4 mos. at R.T.* | Percent Retention | 6 mos. R.T.* | Percent Retention | 1 yr. R.T.* | Percent Retention |
|---|---|---|---|---|---|---|---|---|---|---|---|---|
| 0.1225M Ca++ | 1,000 | 810 | 100 | 12 | | | 320 | 38 | | | | |
| 0.015 M Ca++ | 1,000 | 770 | 100 | 13 | | | 400 | 52 | | | | |
| 0.00125 M Ca++ | 1,000 | 640 | 0 | 0 | | | 220 | 34 | | | | |
| 5% Gelatin | 1,000 | 1,070 | 550 | 51 | 450 | 42 | 460 | 43 | 200 | 19 | 60 | 6 |
| 0.125 M Ca++ and 5% Gelatin | 1,000 | 1,170 | 1,000 | 86 | 1,100 | 94 | 1,130 | 97 | 1,110 | 95 | 1,140 | 97 |
| 0.0125 M Ca++ and 5% Gelatin | 1,000 | 1,120 | 950 | 85 | 950 | 85 | 990 | 88 | 980 | 87 | 1,090 | 97 |
| 0.00125 M Ca++ and 5% Gelatin | 1,000 | 1,080 | 750 | 69 | 730 | 68 | 980 | 91 | 980 | 91 | 970 | 90 |

*Room Temperature.  Percent Retention based on initial assay values.

We claim:

1. A process for preparing a substantially stable solution of a proteolytic enzyme selected from the group consisting of trypsin, chymotrypsin, papain, pepsin, bromelin, and enterokinase, which comprises the steps,
   (1) preparing an aqueous solution containing a proteinaceous substance selected from the group consisting of gelatin, casein, collagen, partially hydrolyzed gelatin, partially hydrolyzed casein and partially hydrolyzed collagen and a water-soluble, pharmaceutically acceptable salt of a metal selected from the group consisting of calcium, cadmium and manganese,
   (2) adjusting the pH of said solution to about 7 by the addition of alkali,
   (3) adding thereto a proteolytic enzyme selected from the group consisting of trypsin, chymotrypsin, papain, pepsin, bromelin, and enterokinase,
   (4) adjusting the pH to between about 5 to 7 by the addition of a pharmaceutically acceptable mineral acid, and
   (5) bringing to the desired volume by the addition of water.

2. A process according to the process claimed in claim 1, wherein the proteolytic enzyme is trypsin.

3. A process according to the process claimed in claim 2 wherein a vasoconstrictor amine selected from the group consisting of phenylephrine, ephredine, tuamine and phenylisopropylamine and their water soluble, pharmaceutiand manganese, said salt being in a concentration of from about 0.002 to 0.2 molar.

8. A substantially stable aqueous solution of a proteolytic enzyme according to claim 7, which contains a vasoconstrictor amine selected from the group consisting of phenylephrine, ephedrine, tuamin, phenylisopropanolamine, and their water-soluble, pharmaceutically acceptable salts.

9. A substantially stable aqueous solution of a proteolytic enzyme according to claim 8 wherein the proteolytic enzyme is trypsin, in an amount of from about 0.2 to 5 mg. per cc., the proteinaceous substance is partially hydrolyzed gelatin, in an amount of from about 20 to 300 mg. per cc., the water-soluble, pharmaceutically acceptable salt of calcium is in a concentration of from about 0.002 to 0.2 molar, and the vasoconstrictor amine is phenylephrine hydrochloride in an amount of from about 0.5 to 12.5 mg. per cc., said solution having a pH between about 5 to 7.

References Cited

UNITED STATES PATENTS

| | | | |
|---|---|---|---|
| 2,887,435 | 5/1959 | Witty et al. | 167—73 |
| 2,930,736 | 3/1960 | Sullivan et al. | 167—73 |
| 3,050,445 | 8/1962 | Damaskus et al. | 167—73 |

ALBERT T. MEYERS, *Primary Examiner.*

JULIAN S. LEVITT, *Examiner.*

LEROY B. RANDALL, *Assistant Examiner.*